Figure 1:
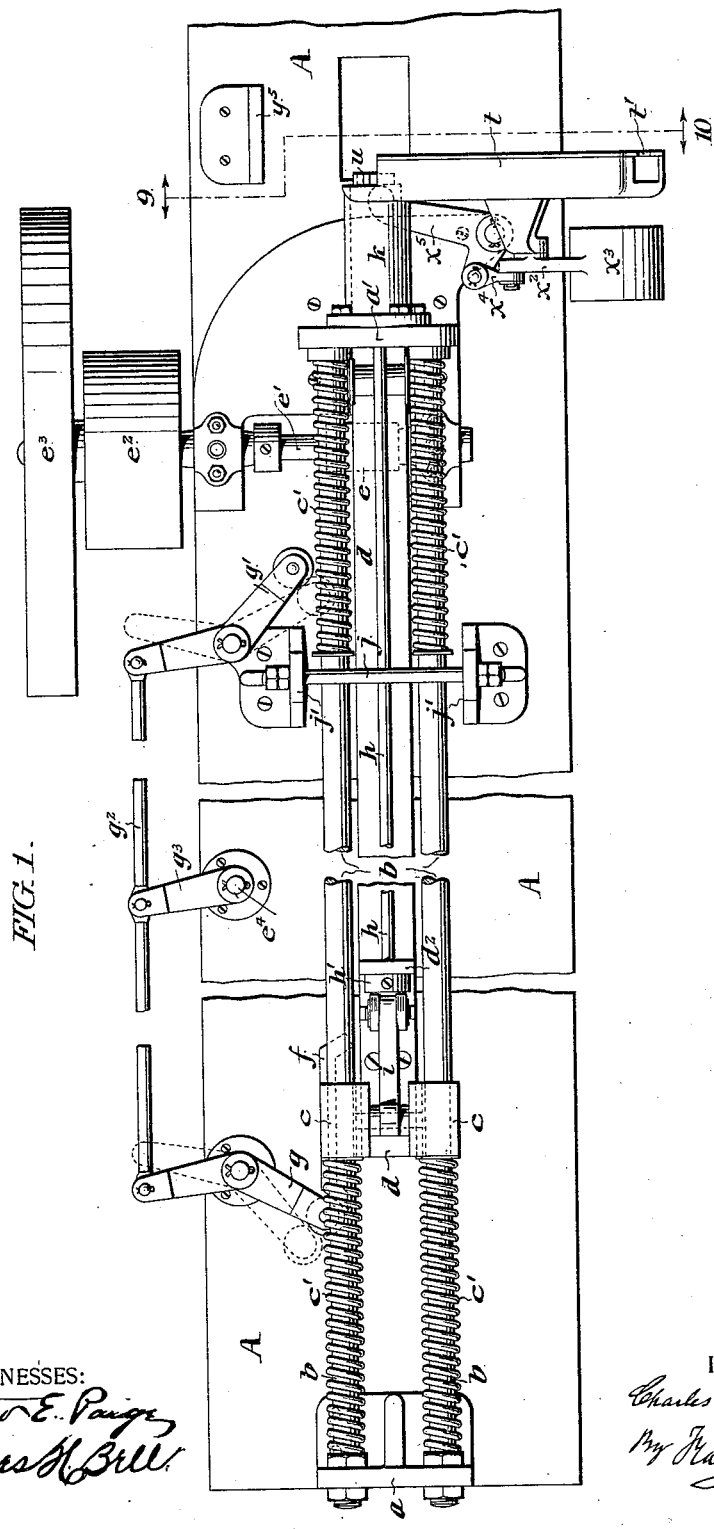

No. 640,602. Patented Jan. 2, 1900.
C. T. THOMPSON.
APPARATUS FOR COMPACTING FEATHERS INTO TUBES.
(Application filed May 9, 1899.)
(No Model.) 6 Sheets—Sheet 1

WITNESSES:

INVENTOR:
Charles T. Thompson,

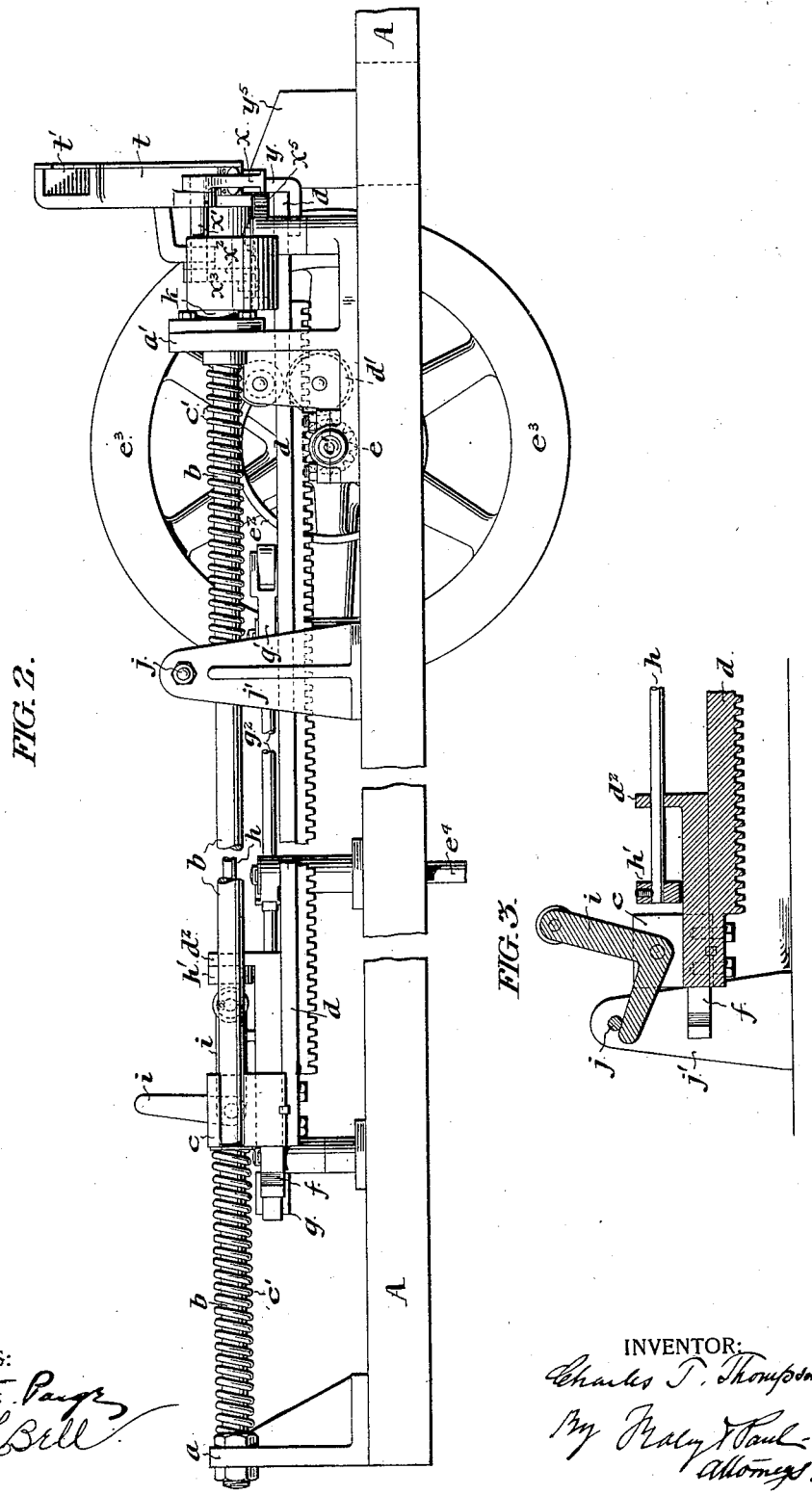

No. 640,602. Patented Jan. 2, 1900.
C. T. THOMPSON.
APPARATUS FOR COMPACTING FEATHERS INTO TUBES.
(Application filed May 9, 1899.)
(No Model.) 6 Sheets—Sheet 3.

WITNESSES:
INVENTOR:

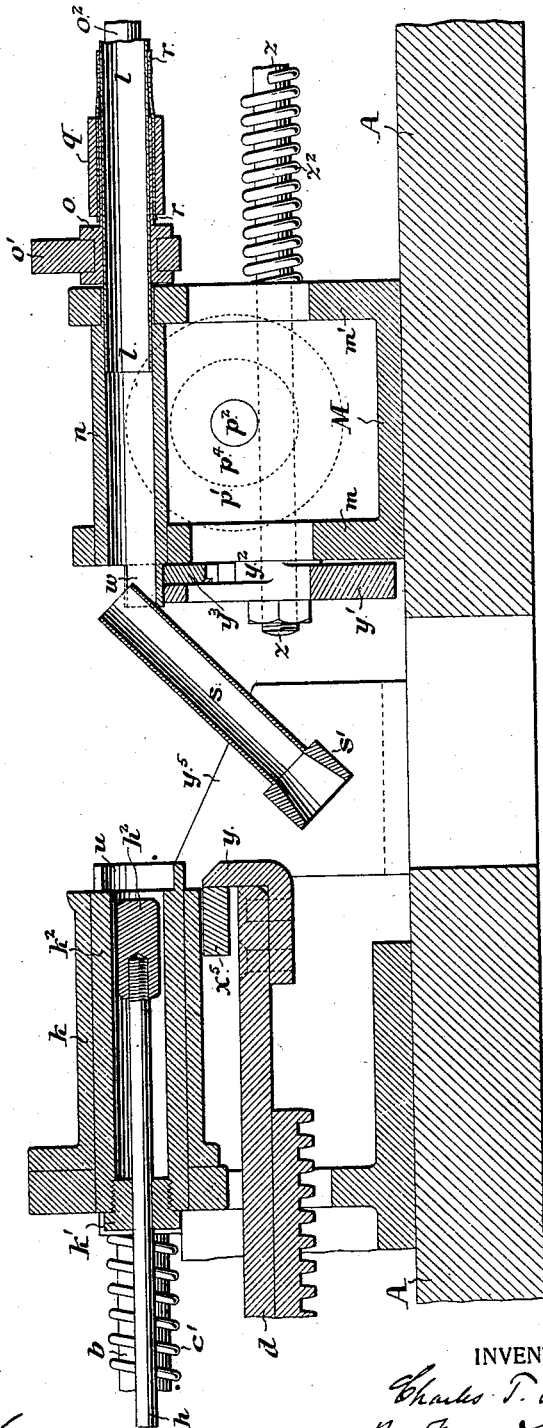

No. 640,602. Patented Jan. 2, 1900.
C. T. THOMPSON.
APPARATUS FOR COMPACTING FEATHERS INTO TUBES.
(Application filed May 9, 1899.)
(No Model.) 6 Sheets—Sheet 5.
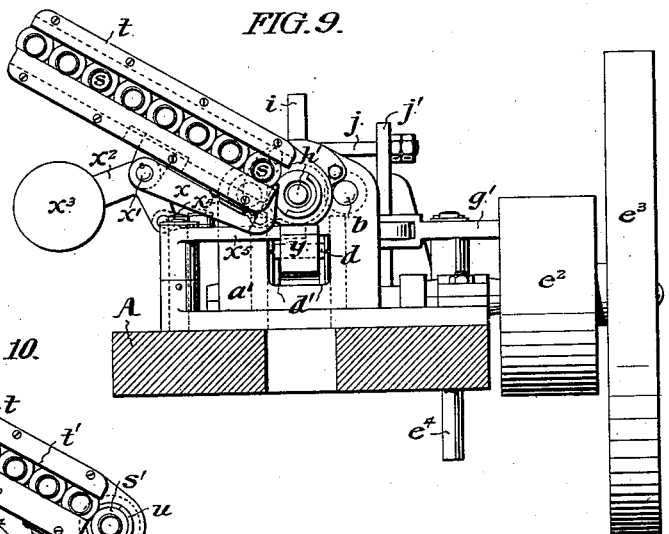
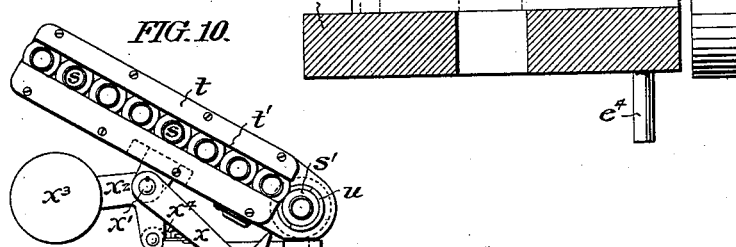
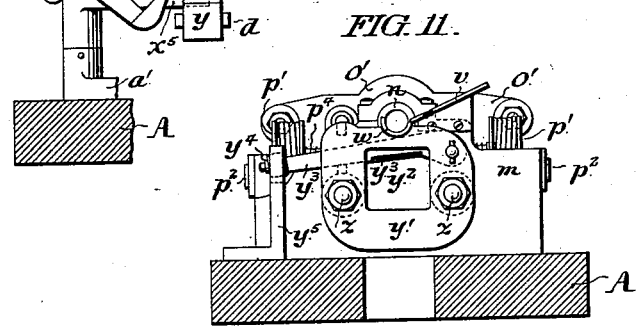
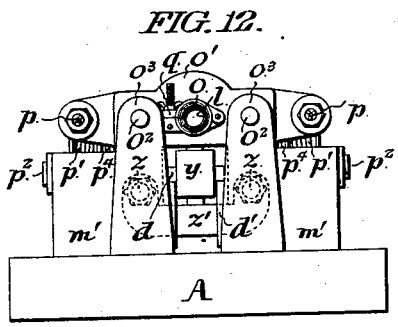
WITNESSES: INVENTOR:
Charles T. Thompson,
By Raley & Paul
Attorneys
THE NORRIS PETERS CO., PHOTO-LITHO., WASHINGTON, D. C.

No. 640,602. Patented Jan. 2, 1900.
C. T. THOMPSON.
APPARATUS FOR COMPACTING FEATHERS INTO TUBES.
(Application filed May 9, 1899.)
(No Model.) 6 Sheets—Sheet 6.
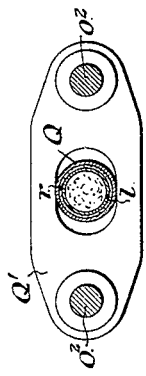
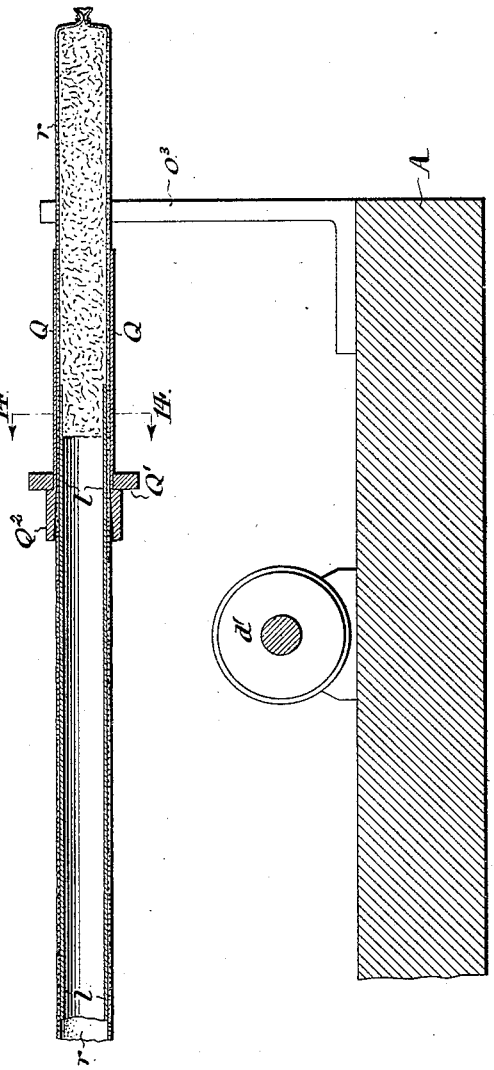
WITNESSES:
INVENTOR:
Charles T. Thompson,

UNITED STATES PATENT OFFICE.

CHARLES T. THOMPSON, OF PHILADELPHIA, PENNSYLVANIA.

APPARATUS FOR COMPACTING FEATHERS INTO TUBES.

SPECIFICATION forming part of Letters Patent No. 640,602, dated January 2, 1900.

Application filed May 9, 1899. Serial No. 716,094. (No model.)

*To all whom it may concern:*

Be it known that I, CHARLES T. THOMPSON, of the city of Philadelphia, in the State of Pennsylvania, have invented certain new and useful Apparatus for Compacting Feathers in Tubes, whereof the following is a specification, reference being had to the accompanying drawings.

My invention relates to an apparatus for compacting a mass of feathers or other similar mass in a flexible tube, so as to convert the tube into an elastic cushion suitable for use as or in connection with bicycle or other elastic vehicle tires.

I will describe my invention as it is used for the purpose of compacting feathers into a canvas tube, it being understood that tubes of other material may be used and that the contents of the tube may be some other substance.

In its general features the machine which I am about to describe consists of a long metal tube suitably supported, over which is fitted more or less tightly the canvas tube which it is desired to fill with the compacted material. One end of this canvas tube is closed, while all the rest of the tube is initially drawn over the metal tube. Through this metal tube, and consequently against the closed end of the surrounding canvas tube, a reciprocating plunger drives successively the contents of a series of cartridges, each containing a charge of the material which is to be compacted. As the length of the throw of the plunger is fixed, the gradual filling of the surrounding canvas tube causes this tube to be forcibly slid off from the metal tube. It will thus be seen that the degree to which the contents of the canvas tube are compacted depends upon the extent of the resistance which has to be overcome to cause it to slide off the metal tube. This resistance may be varied, and consequently the force with which the contents of the tube are compacted may be regulated. My present invention relates to certain parts of a machine having these general features of construction. Among others, it includes an automatic reversing mechanism by means of which the reciprocation of the plunger is effected, an automatic feeding mechanism for the series of cartridges, which by their advance successively deliver their charges in position to be driven by the plunger into the metal tube, and certain other features, the details of which will be understood from the following specification.

My machine consists of parts which though interconnected may each be described separately. These parts are respectively a plunger-actuating mechanism and a tube supporting and feeding mechanism. These parts are mounted in alinement with each other upon a single substantial base A.

Figure 4:
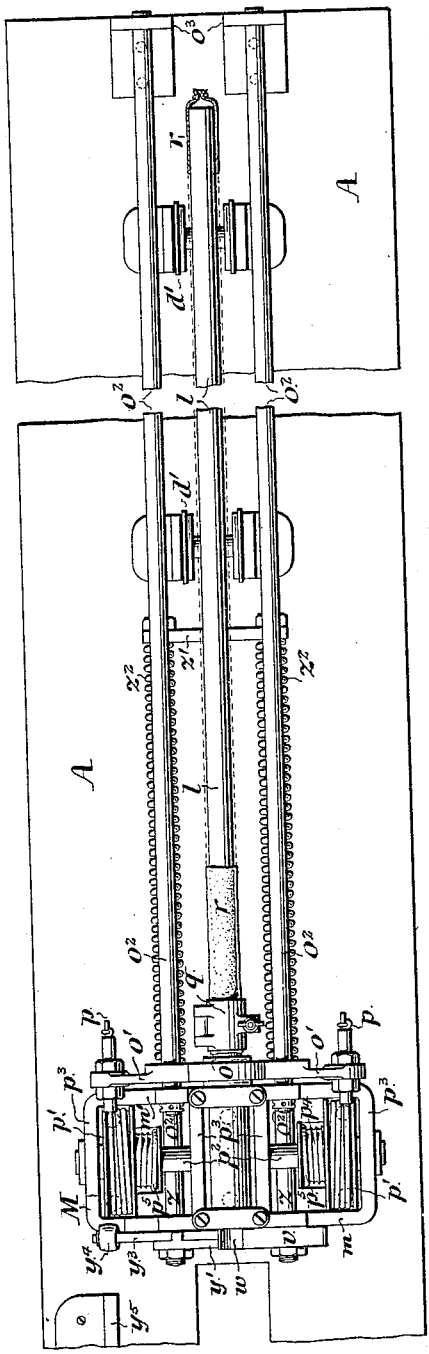
Figure 5:
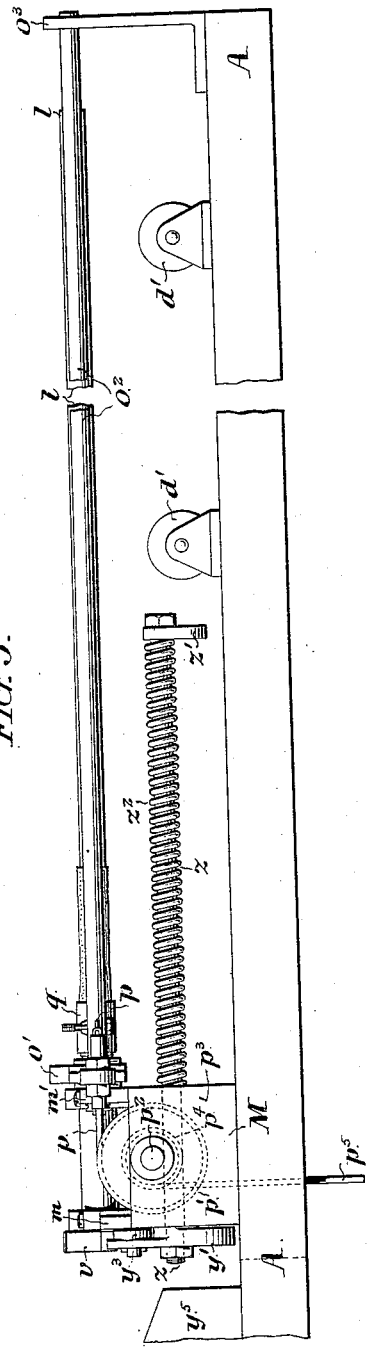

Figures 1 and 2 are respectively a plan and an elevation of the plunger-actuating mechanism, certain breaks in the drawings being indicated in order to prevent too great length of the drawings. Fig. 3 is a vertical central section through a portion of the mechanism seen in Fig. 2, the plunger being at the other extremity of its stroke. Figs. 4 and 5 are respectively a plan and an elevation of the corresponding tube-supporting mechanism. Fig. 6 is an enlarged vertical section of the adjacent ends of the two mechanisms which have been mentioned, showing the interrelation of the parts. Fig. 7 is a plan view of the plunger-guide which forms the extreme right-hand end of the plunger-actuating mechanism. Fig. 8 is a similar view of the cartridge-seat which forms the extreme left-hand end of the tube-supporting mechanism. Fig. 9 is a vertical cross-section of the machine through the line 9 10, Fig. 1, with parts in elevation, as seen when looking toward the plunger-actuating mechanism. Fig. 10 is a partial view, the same as Fig. 9, with certain parts removed and position of detent changed for clearness of illustration. Fig. 11 is a section similar to Fig. 9 with the parts in elevation as seen when looking toward the tube-supporting mechanism illustrated in Fig. 4. Fig. 12 is an end elevation of the tube-supporting mechanism as viewed from the right-hand end of Fig. 4. Fig. 13 is a vertical longitudinal section of the right-hand portion of the parts seen in Fig. 5, showing the tube-gage in position. Fig. 14 is a cross-section of the same along the line 4 4, Fig. 13, illustrating the means used for the support of the tube-gage.

*The plunger-actuating mechanism.*—Upon the base A, Fig. 1, suitable standards $a\,a'$ support two parallel rods $b$, constituting a longitudinal slideway. A cross-head $c$ runs on this slideway, the shock due to its momentum at either end of its stroke being balanced by coiled springs $c'$ $c'$ $c'$ $c'$, surrounding both ends of the rods $b$. To the lower side of the cross-head $c$ a long rack $d$ is attached at its rear extremity. The balance of the length of the rack is supported by paired rollers $d'$. It will be noticed that in the course of its forward motion this rack travels under the tube-supporting mechanism, which is to be described, during which traverse it is similarly supported by similar pairs of rollers similarly lettered. The rack is engaged by a pinion $e$ upon the shaft $e'$, carrying the driving-pulley $e^2$ and momentum-wheel $e^3$. The pulley $e^2$ is connected with a reversing-belt and pulleys, the actuation of which is accomplished in the usual way by mechanism which is not shown, but which is controlled by the vertical rock-shaft $e^4$.

Attached to the cross-head $c$ is a shoe $f$, the extremities of which alternately strike the impeding-arms of the bell-crank levers $g$ $g'$. The other arms of these levers are united by a rod $g^2$, to which is pivoted the crank $g^3$ upon the vertical rock-shaft $e^4$. The alternate partial revolution of this rock-shaft, which is effected by the mechanism just spoken of, actuates the reversing-belt and pulleys, which drive the pulley $e^2$ through any known form of clutch or other reversing mechanism. Thus the cross-head at either extremity of its play occasions the reversal of the driving mechanism, whereby constant reciprocation is secured.

A plunger $h$ of approximately the length of the rack is supported a short distance above the rack and moves under its control. Its rear extremity passes freely through and is supported by a transverse supporting-flange $d^2$, Fig. 3, fastened to and above the rack near the cross-head $c$, and carries a fixed collar $h'$, which during the retreat of the rack engages the flange $d^2$, so that both plunger and rack move together. In the middle of the cross-head $c$ and immediately in the rear of the plunger there is provided a vertically-oscillating bell-crank lever $i$, the forward arm of which is the heavier one. When the forward arm of this lever is in its horizontal and normal position, its extremity engages the rear end of the plunger $h$, substantially locking it between itself and the flange $d^2$. When, however, the cross-head has nearly reached the forward extremity of its stroke, the rear end of this bell-crank lever comes in contact with the fixed cross-pin $j$, supported by standards $j'$, raising the forward arm of the lever nearly to the vertical position. By reason of this motion the rack advances a short distance farther than the plunger, which remains stationary until the contact of the shoe $f$ with the lever $g$ reverses the motion of the rack, which in its retreat immediately takes up the plunger and carries it back with it. By reason of the mechanism which has just been described the forward motion of the plunger is completed and the strain upon the driving mechanism which its impact occasions is finished before the rack is compelled to assume the additional work of actuating the reversing mechanism.

To the standard $a'$ and immediately in front thereof is fastened a plunger-guide $k$, containing an internal sleeve $k^2$ and a collar $k'$, through which the forward end of the plunger slides easily and accurately. The remaining details of this piece belong more properly to the cartridge-feeding mechanism and will be described in connection therewith hereinafter. It will be noticed that the forward end of the plunger carries an enlarged plunger-head $h^2$, Fig. 6.

*Tube-supporting mechanism.*—Upon the base A, immediately in front of the plunger-actuating mechanism and in alinement with the plunger, there is supported a long metal tube $l$, preferably of brass. The tube is open at both ends and obtains its support at the end nearest the plunger-actuating mechanism from the substantial double standard M, Fig. 6. This double standard consists of two transverse plates $m$ $m'$, between which is mounted the cartridge-seat $n$, which is seen in section in Fig. 6 and in plan view in Fig. 8. The rear end of the tube enters the cartridge-seat a sufficient distance to obtain a firm support therefrom. The tube should be of sufficient thickness and strength to be self-supporting for the remainder of its length. Over this tube there runs freely a sliding sleeve $o$, the rear end of which is enlarged to form a collar, which is held within the transverse plate $o'$. This transverse plate has apertures, whereby it runs freely on a slideway formed by two slide-rods $o^2$ $o^2$, which are mounted at their rear ends on the plate $m'$ of the standard M and at their forward ends are supported by standards $o^3$ at the end of the base A. This transverse plate has attached to it a pair of cords $p$ $p$, which pass back from the plate and around a pair of drums $p'$ $p'$, mounted on transverse shafts $p^2$ $p^2$, which are journaled in the longitudinal plates $p^3$ $p^3$ $p^3$ $p^3$, which connect the transverse plates $m$ $m'$ of the standard M. The shafts $p^2$ carry also a second pair of drums surrounded by the reversed cords $p^5$ $p^5$, the free ends of which cords depend through and below the base and carry suitable weights. (Not shown in the drawings.) These weights tending to unwind the cord $p^5$, and hence to wind up the cords $p$ on the drums $p'$ $p'$, draw the transverse plate $o'$ and the sleeve $o$ toward the rear of the machine.

A long flexible tube $r$—for example, of canvas—closed at the end, is drawn over the tube $l$ and the sleeve $o$ and firmly clamped to the sleeve $o$ by the clamp $q$. It will be observed that as the constant forward impact of the plunger drives the material through the tube $l$ into the closed end of the surrounding canvas tube $r$ the compacting of the material at the closed end of the tube will constantly compel the flexible tube of the sleeve $o$ to advance forward over the tube $l$ against the resistance imposed by the weight which has been spoken of. It is also obvious that the tightness with which the flexible tube will be packed will depend upon the extent to which this weight causes the flexible tube to oppose the impact of the plunger.

*Feeding mechanism.*—$s$, Fig. 6, represents a metal cartridge of convenient length, open at both ends, capable of fitting snugly into the cartridge-seat $n$, and registering accurately with the tube $l$ within the cartridge-seat. The rear end of the cartridge is enlarged in the form of a collar $s'$ and the opening therein flared to more readily receive the head of the plunger. For convenience there should be an indefinite number of these cartridges.

To the forward end of the plunger-guide $k$, which has previously been described, there is mounted a slotted cartridge-feed $t$, the exact shape of which is clearly shown in Figs. 1, 2, 9, and 10. This cartridge-feed receives and carries a number of cartridges surrounding the collars $s'$ of the cartridge and allowing the cartridge-tubes to project through the slot $t'$. The feed has a downward incline, so that the cartridges sliding freely therein are delivered by gravity almost immediately above the end of the plunger-guide. As each cartridge leaves the guide it falls directly opposite the open end of the plunger-guide, its collar striking against and being retained by a partial circular flange $u$, surrounding the opposing side of the open end of the sleeve $k^2$. The exact shape and position of this flange $u$ are clearly shown in Figs. 6 and 7. As the cartridges pass down through the feed retained by their collar ends their opposite free ends come in contact with and ride along an inclined guide-plate $v$, affixed to the rear end of the rear side of the transverse plate $m$ of the tube-supporting mechanism. The rear end of the cartridge-seat $n$ carries a semicircular flange $w$, corresponding in shape and position to the flange $u$ of sleeve $k^2$, and each cartridge upon reaching the end of the feed is delivered so that while its collar rests upon the flange $u$ its opposite end rests upon and is supported by the flange $w$ and in alinement with the plunger on the one side and the tube $l$ on the other. From this position the advance of the plunger-head coming into contact with the cartridge drives it forward into the cartridge-seat $n$ to its extreme forward position. The release of one cartridge from the cartridge-guide to succeed the one so driven forward does not immediately occur, by reason of the pivoted detent $x$, which normally is in the position seen in Fig. 9, upon the horizontal rock-shaft $x'$, which carries a bell-crank lever $x^2$, one end of which carries the counterweight $x^3$. The other arm of the bell-crank lever forms the crank by which the rock-shaft is actuated and has pivoted to it a link $x^4$, the other extremity of which is pivoted to one arm of a second horizontal rocking bell-crank lever $x^5$. The long arm of this lever $x^5$ is in a plane immediately above the level of the reciprocating rack $d$ and normally projects transversely across its path in the position indicated upon Fig. 6 by the section marked $x^5$. It will be observed from this figure that the extreme forward end of the rack has attached to it an upwardly-projecting flange $y$, which comes in contact with this lever $x^5$ when the rack is in the position seen in Fig. 6, which is almost the extreme end of its retreat. In this position the counterweight $x^3$ still retains the detent $x$, so as to prevent the advance of another cartridge along the cartridge-guide; but with the slight farther retreat of the rack immediately before its reversal the lever $x^5$ is sufficiently moved by contact with the flange $y$ to momentarily depress the detent $x$ and allow the descent of another cartridge. On the reversal of the rack occurring the detent returns to its usual position, slightly raising the line of cartridges in the feed. The position of these parts, with the detent depressed, so as to allow the feed of the cartridge, is seen in Fig. 10.

$y'$ is a vertical transverse plate which performs the function of a cartridge-extractor. Its exact position is best seen in Fig. 11, while its cross-section and certain other details are best seen in Figs. 6, 4, and 5. It is pierced centrally to allow the passage of the rack through it by the aperture $y^2$. It carries on its forward side a pivoted lever $y^3$, the lower edge of which forms the top of the aperture $y^2$. This lever $y^3$ is normally in a position to come into contact with the flange $y$ of the rack as the latter advances through the plate $y'$. It does not, however, prevent this advance by reason of the opposing beveled edges, respectively, of the flange $y$ and of the lever $y^3$, whereby upon the advance of the rack the lever is slightly lifted to permit the former's passage. The plate $y'$ is normally held in position with its upper edge immediately below the flange $w$ of the cartridge-seat, its position being maintained by two stout forwardly-projecting rods $z$ $z$, which run through suitable holes in the standard M and are connected at their forward ends by the cross-plate $z'$. These rods are surrounded by coiled springs $z^2$, which by their pressure hold the cartridge-extracting plate $y'$ in the position seen in Fig. 6. Near the end of the retreat of the rack the flange $y$ upon its extremity again comes in contact with the pivoted lever $y^3$ on the cartridge-extractor; but as the sides now opposed are not beveled they engage each other, and the further retreat of the rack draws the cartridge-extractor back far enough to pull the cartridge from its seat and allow it to fall, as seen in Fig. 6. Having accomplished this work, the lever $y^3$ is disengaged from the flange $y$ by reason of its being raised by a small roller $y^4$, which rides up an inclined plane $y^5$ until disengagement occurs.

It will be seen that this cartridge-extracting mechanism performs its work, is disengaged, returns to its normal position, and allows the unseated cartridge to fall before the extreme rearward retreat of the rack depresses the detent $x$ and allows the descent of a new cartridge, this exact juncture being illustrated in Fig. 6.

I have referred incidentally to the operation of many of the parts in the course of their description, but will here recapitulate the method of operation of the machine. The cartridges are filled by hand or in any other convenient manner with feathers and placed continuously in the cartridge-guide, from which they descend until the extreme one is supported, as has been described, immediately between the plunger-actuating mechanism and the tube-supporting mechanism. The machine being set in operation, the plunger $h$ advances from the position seen in Fig. 6, first driving the cartridge into its seat and then driving the contents through the metal tube $l$ and depositing and compacting these contents at the closed end of the flexible canvas tube $r$, which surrounds the metal tube. As has been explained, the force of this compacting depends upon the extent of the resistance of the sleeve $o$, to which the open end of the flexible tube is attached, and can be varied to suit the hardness of the packing desired. The plunger $h$ having reached its extreme forward stroke, the lever $i$, which controls its forward motion, is tripped and allows the rack $d$ to advance a short distance without the plunger until the reversing mechanism has come into operation and started the retreat. Immediately the plunger is again taken up by the rack, on account of the contact of the collar $h'$ with the flange $d^2$, and withdrawn through the tube $l$. As the head $h^2$ passes backward through the empty cartridge it assists the cartridge-extracting mechanism, which at this moment comes into operation, unseating the cartridge and drawing its collar $s'$ sufficiently forward to allow the upper edge of its forward end to clear the upper edge of the rear end of the cartridge-seat before the collar $s'$ quite reaches the flange $u$, at which point the weight of the collar end of the cartridge is sufficient to slightly depress that end of the cartridge and prevent its being reseated upon the flange $u$ of the plunger-guide, instead of which as the plunger-head is withdrawn the cartridge falls down of its own weight. The farther retreat of the rack immediately before reversal depresses the detent and allows a new cartridge to be fed into place, whereupon reversal again occurs, the advance of the plunger begins, and the contents of the new cartridge are driven forward into the flexible tube. This operation is repeated until the tube is entirely filled.

In Figs. 13 and 14 I have shown a useful adjunct to my machine in the form of a sleeve Q, which acts as a tube-gage. This I support so as to surround the flexible tube immediately at and beyond the end of the interior metal tube, over which it slides. I find that each impact of the plunger driving its charge of feathers forward has a tendency to produce a slight unevenness or "balling" of the feathers as they are driven charge by charge into the tube. This I find I can overcome by the use of this gage. The shape and proportions of the gage are precisely those of one of the cartridges which I have described, except that the interior diameter corresponds to the external diameter of the flexible tube instead of to the internal diameter of the metal tube. It is held in position by a metal plate $Q'$, mounted vertically upon and between the rods $o^2$, immediately in the rear of the end of the metal tube $l$. This transverse plate has a central aperture in the shape seen in Fig. 14. The tube-gage passes freely through this aperture until restrained by the enlargement of the collar $Q^2$, there being, however, sufficient play to allow for some transverse motion. It remains in the same longitudinal position upon the machine as the flexible tube advances through it and by encircling that part of the tube to which the successive charges of the feathers are being driven distributes the pressure of each impact therein and causes the tube to be packed with perfect evenness.

Having thus described my invention, I claim—

1. In an apparatus for compacting tubes with feathers, the combination of a reciprocating plunger of uniform stroke; a long metal tube, open at both ends, and held in position to receive the entire stroke of the plunger; a series of cartridges of similar internal diameter and open at both ends; means substantially as described, whereby the cartridges are automatically and successively fed and held in position in front of the open end of the tube into which the plunger enters; and means substantially as described whereby upon completion of the stroke of the plunger, the empty cartridge is removed from its position before a new cartridge is fed in place, substantially as described.

2. In an apparatus for compacting tubes with feathers, the combination of a sliding plunger; an automatically-reciprocating sliding bar; a connection between the two which is positive during a period of the motion of reciprocation; and means, substantially as described, whereby the sliding bar, shortly before reaching the forward extremity of its stroke, is temporarily released from its connection with the plunger, whereby the reversal of the motions of the plunger and of the sliding bar at the forward extremities of their strokes are prevented from being synchronous, substantially as described.

3. In an apparatus for compacting tubes with feathers, the combination of a reciprocating plunger of uniform stroke; a metal tube; a series of cartridges, open at both ends; and a slotted cartridge-guide whereby the cartridges are successively delivered in position in front of the metal tube and in alinement with the plunger, substantially as described.

4. In an apparatus for compacting tubes with feathers, the combination of a reciprocating plunger; a metal tube and cartridge-seat at one extremity of the metal tube; means for successively inserting a series of cartridges into a cartridge-seat; and a cartridge-extractor consisting of the plate, $y'$, the pivoted lever, $y^3$, beveled upon one side, the inclined plane, $y^5$, and the flange, $y$, operatively connected with the reciprocating plunger beveled upon one edge and reciprocating in operative connection with the pivoted lever, $y^3$, substantially as described.

5. In an apparatus for compacting tubes with feathers, the combination of a reciprocating plunger; a series of cartridges, open at both ends; a long metal tube, open at both ends; and a tube-gage surrounding the extreme end of the metal tube and of sufficient internal diameter to allow a canvas tube or similar article to slide within it and outside the metal tube, substantially as described.

CHARLES T. THOMPSON.

Witnesses:
   JAMES H. BELL,
   E. REESE.